US007669827B2

(12) United States Patent
Urrutia

(10) Patent No.: US 7,669,827 B2
(45) Date of Patent: Mar. 2, 2010

(54) STRING LIGHT HANGING KIT

(76) Inventor: Remberto D Urrutia, 15570 SW. 182nd La., Miami, FL (US) 33187

(*) Notice: Subject to any disclaimer, the term of this patent is extended or adjusted under 35 U.S.C. 154(b) by 0 days.

(21) Appl. No.: 12/023,560

(22) Filed: Jan. 31, 2008

(65) Prior Publication Data

US 2009/0194662 A1 Aug. 6, 2009

(51) Int. Cl.
*F16M 13/00* (2006.01)

(52) U.S. Cl. ...................................... 248/544; 248/351

(58) Field of Classification Search ................. 248/544, 248/351, 353, 357, 121, 125.1, 125.8; 363/249, 363/151, 152

See application file for complete search history.

(56) References Cited

U.S. PATENT DOCUMENTS

| | | | | |
|---|---|---|---|---|
| 2,634,999 | A * | 4/1953 | Fjeld | 81/53.11 |
| 3,161,435 | A * | 12/1964 | Halverson | 297/423.39 |
| 4,278,223 | A * | 7/1981 | Fauteux | 248/125.8 |
| D298,728 | S * | 11/1988 | Bergkvist et al. | D8/51 |
| 5,267,764 | A * | 12/1993 | Hoffman et al. | 294/19.1 |
| D356,492 | S | 3/1995 | Adams et al. | |
| 5,496,005 | A * | 3/1996 | Dieringer | 248/74.2 |
| D369,961 | S | 5/1996 | Hedtke | |
| 5,553,905 | A | 9/1996 | Bentivegna | |
| 6,347,780 | B1 | 2/2002 | Holbrook | |
| 6,659,521 | B2 | 12/2003 | Hill et al. | |
| 6,685,151 | B2 | 2/2004 | Vasquez et al. | |
| 6,832,746 | B2 * | 12/2004 | McCracken et al. | 248/357 |
| 6,883,768 | B1 | 4/2005 | Morin | |
| 2004/0104231 | A1 * | 6/2004 | Hassell et al. | 220/6 |

* cited by examiner

*Primary Examiner*—Ramon O Ramirez

(57) ABSTRACT

The present invention features a kit for hanging string lights. The kit comprises a bracket and a mounting tool. In some embodiments, the bracket comprises a first plate having a first edge and a second edge, a second plate extending upwardly and along the first edge of the first plate, a third plate extending upwardly and along the second edge of the first plate, and a hook disposed on a surface of the third plate that extends in a direction away from the second plate. In some embodiments, a mounting tool comprises cup member attached to a pole. The cup member comprises a base member having a first end and a second end, a first arm attached to and extending outwardly from the first end of the base member, a second arm attached to and extending outwardly from the second end of the base member, the first and second arm extending outwardly in the same direction relative to the base member, and a pole attaching to and extending downwardly from the base member.

1 Claim, 5 Drawing Sheets

STRING LIGHT HANGING KIT

FIELD OF THE INVENTION

The present invention is directed to a device for hanging a string light on or near a roof without the need to use a ladder.

BACKGROUND OF THE INVENTION

Hanging string lights (e.g., Christmas lights) for the holiday season often requires the use of ladders for reaching high places. A person climbing a ladder to hang string lights may risk falling and hurting himself or herself. Thus, there is a need to have a safer system/kit for hanging string lights.

SUMMARY OF THE INVENTION

The present invention features a kit for hanging string lights. The kit comprises a bracket and a mounting tool. In some embodiments, the bracket comprises a first plate having a first edge and a second edge, a second plate extending upwardly and along the first edge of the first plate, a third plate extending upwardly and along the second edge of the first plate, and a hook disposed on a surface of the third plate that extends in a direction away from the second plate. In some embodiments, a mounting tool comprises a cup member attached to a pole. The cup member comprises a base member having a first end and a second end, a first arm attached to and extending outwardly from the first end of the base member, a second arm attached to and extending outwardly from the second end of the base member, the first and second arm extending outwardly in the same direction relative to the base member, and a pole attached to and extending downwardly from the base member. In some embodiments, the cup member can tightly hug the bracket when the first plate of the bracket is placed onto the base member of the cup member and between the first and second arms of the cup member; the first and second arms are effective to stabilize the bracket placed onto the base member.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 shows a bracket being hugged by the mounting tool and is pushed to fit over the sideboard of a house, where second and third plate of the bracket tightly clamps the sideboard in between.

DESCRIPTION OF PREFERRED EMBODIMENTS

Figure 1:
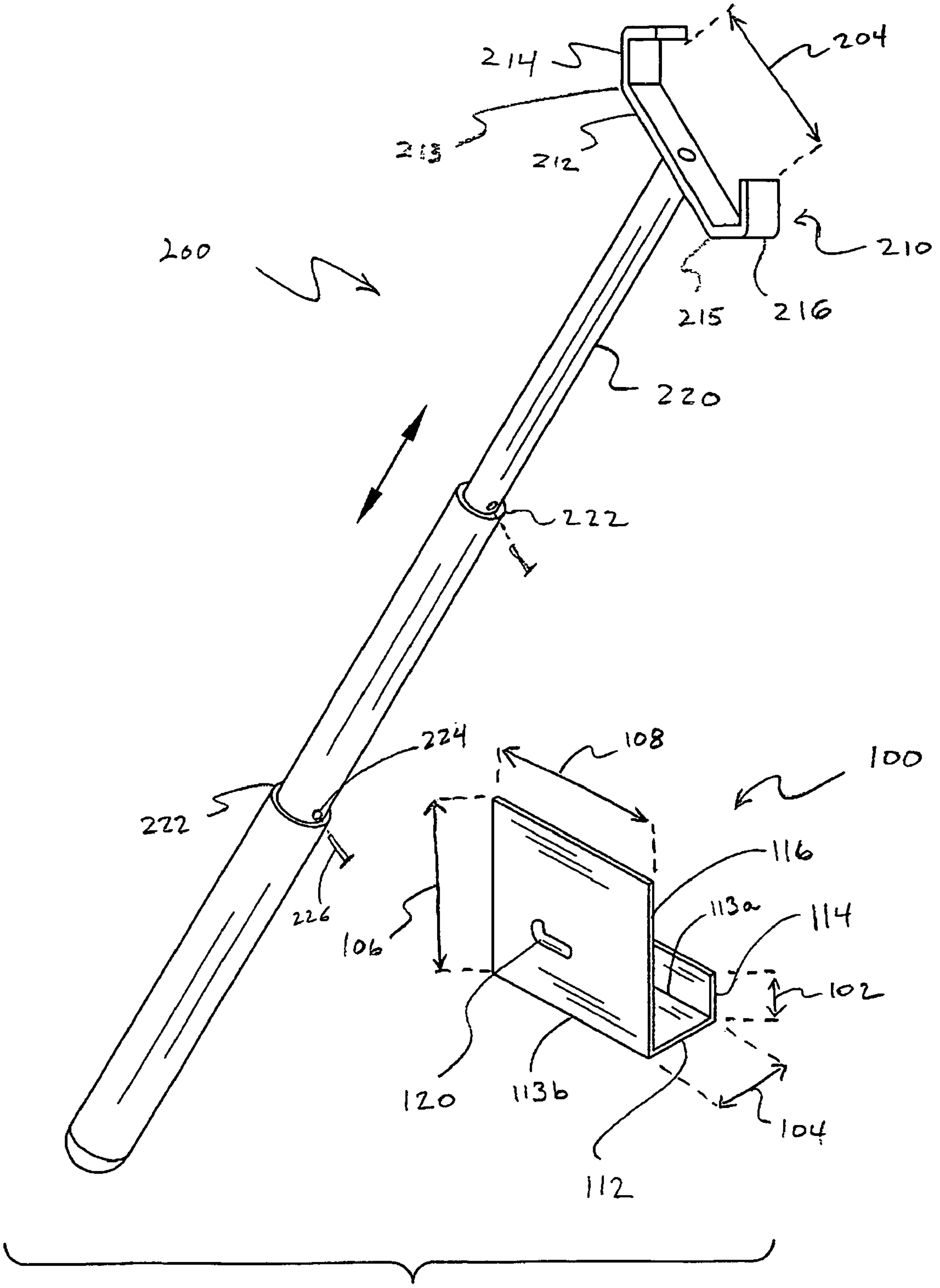
FIG. 1 shows a kit comprising a bracket and a mounting tool.
Figure 2:
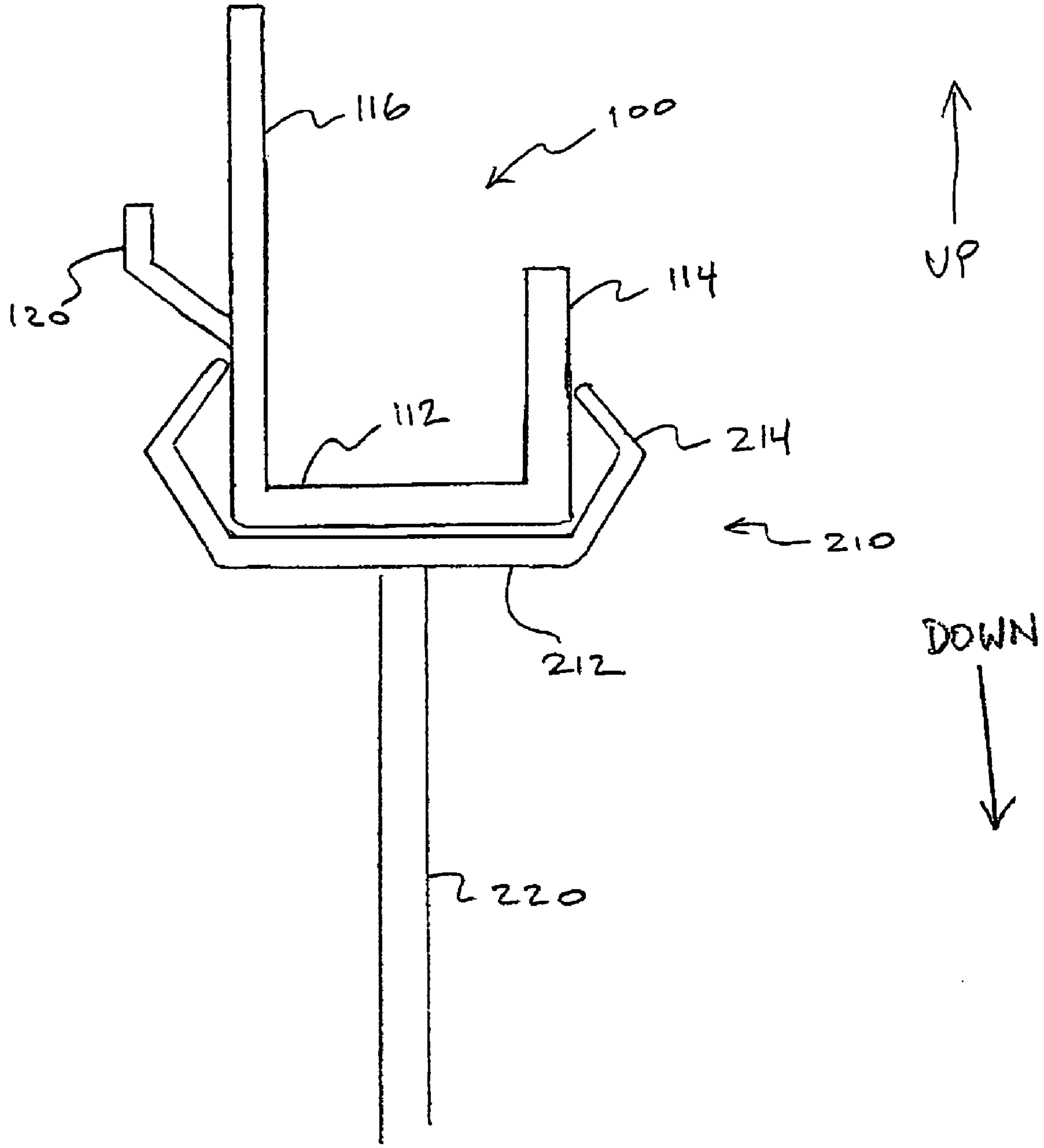
FIG. 2 shows a bracket being hugged by the mounting tool. The second and third plate of the bracket extends upwardly relative to the horizontally shown first plate, and the direction of "up" is indicated.

The present invention features a kit for hanging string lights 500, the kit comprises a bracket 100 and a mounting tool 200 (see FIG. 1). In some embodiments, the bracket 100 comprises a first plate having a first edge 113*a* and a second edge 113*b*, a second plate 114 extending upwardly and along the first edge of the first plate 113*a*, a third plate 116 extending upwardly and along the second edge of the first plate 113*b*, and a hook 120 disposed on a surface of the third plate 116 and extends in a direction away from the second plate 114. As used herein, the term "upwardly" is in the direction of the "up" arrow as shown in FIG. 2, and the term "downwardly" is in the direction of the "down" arrow as shown in FIG. 2. In some embodiments, a mounting tool 200 comprises cup member 210 attached to a pole 220. The cup member 210 comprises a base member 212 having a first end 213 and a second end 215, a first arm 214 attached to and extending outwardly from the first end of the base member 213, a second arm 216 attached to and extending outwardly from the second end of the base member 215, the first 214 and second arm 216 extending outwardly in the same direction relative to the base member 212, and a pole 220 attaching to and extending downwardly from the base member 212. In some embodiments, the cup member 212 can tightly hug the bracket 100 when the first plate 112 of the bracket 100 is placed onto the base member 212 of the cup member 210 and between the first 214 and second arm 216 of the cup member, the first 214 and second arm 216 are effective to stabilize the bracket 100 placed onto the base member 212 (see FIG. 2).

Figure 3:
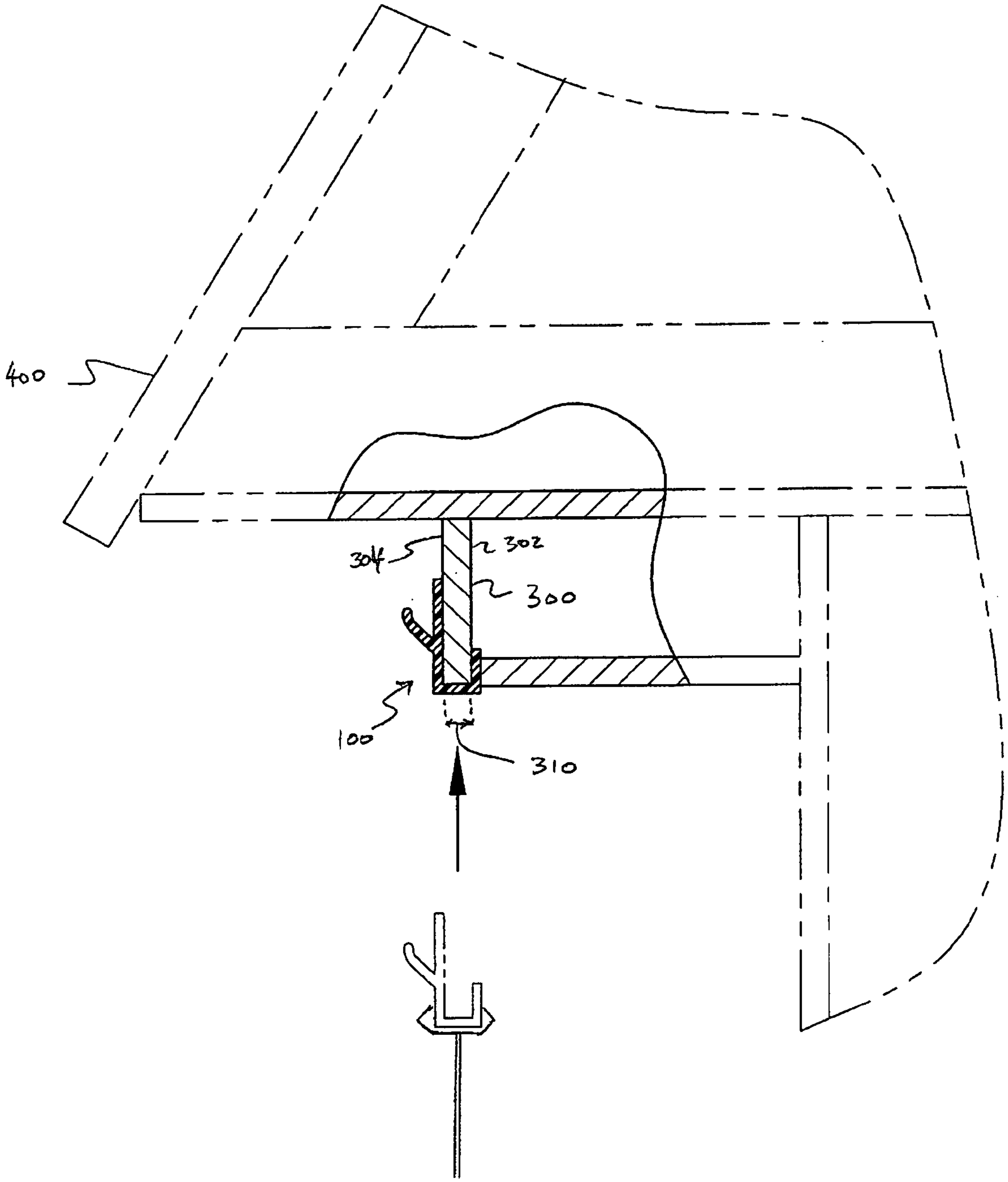
Figure 4:
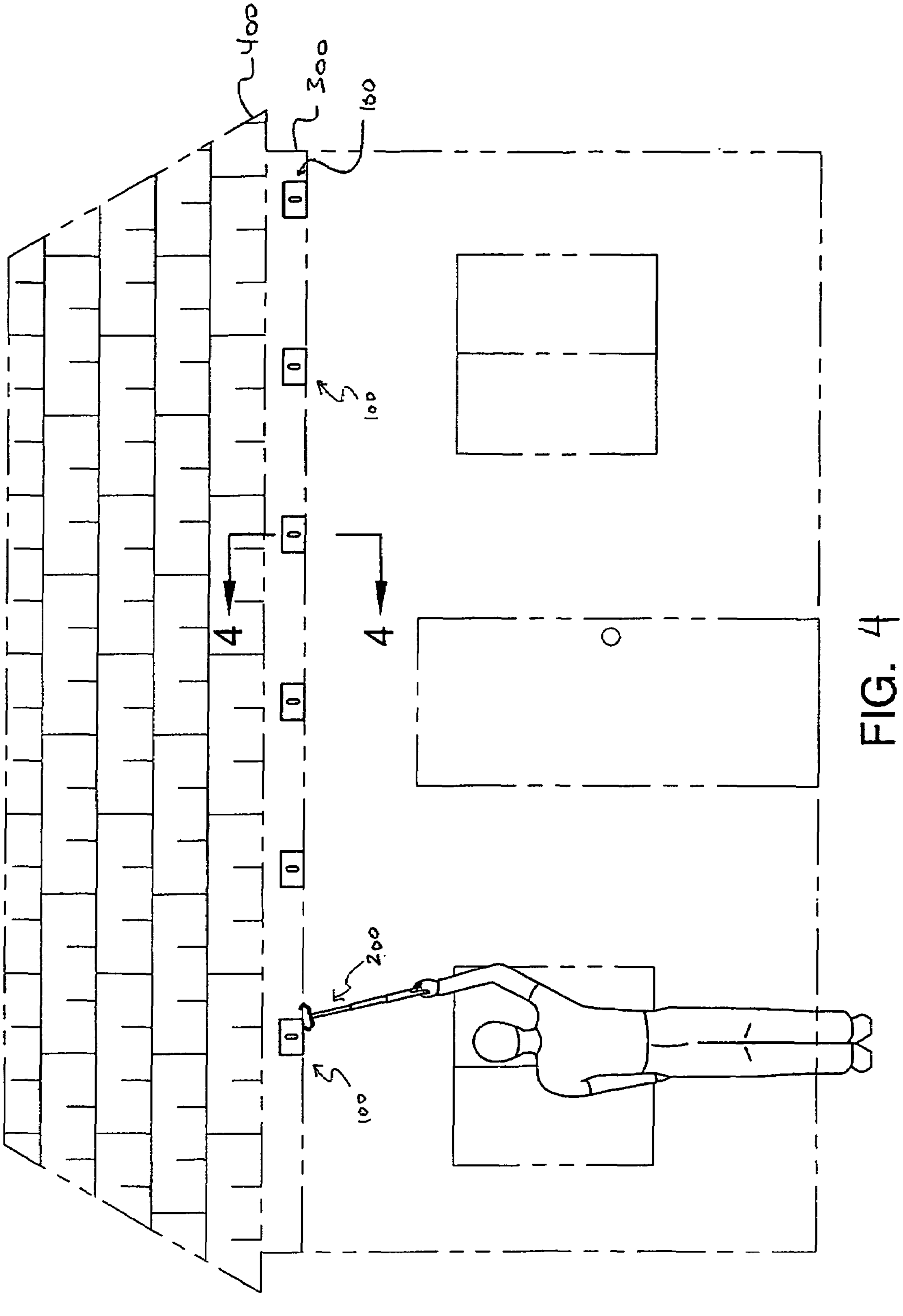
FIG. 4 shows a user using the mounting tool to further push the bracket against the sideboard of the house. The brackets are installed along the length of the sideboard of the house.
Figure 5:
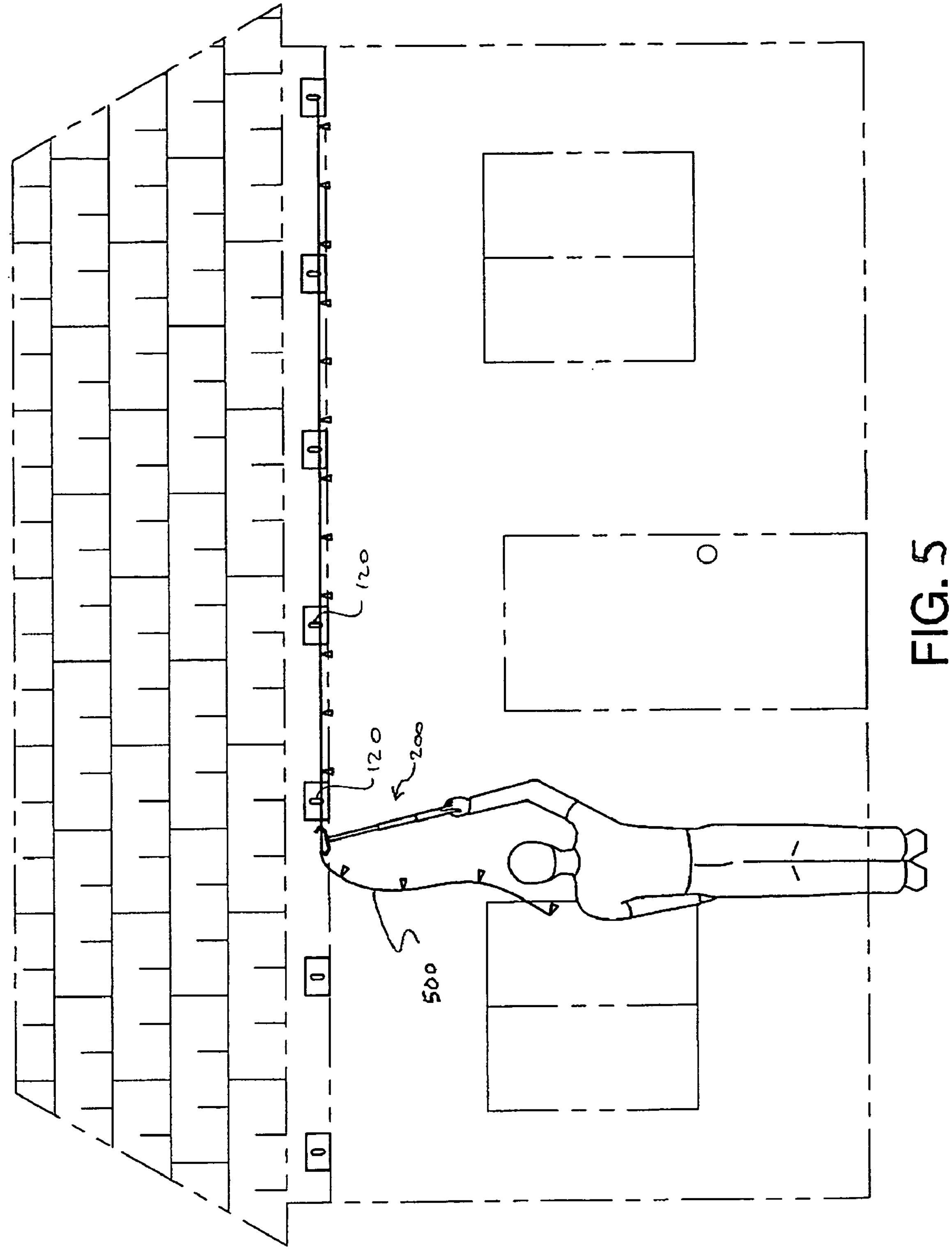
FIG. 5 shows a user using the mounting tool to loop a string light (e.g., Christmas light) over the hooks of the brackets.

To hang the string lights 500 at or near the roof 400 of a house, a plurality of brackets 100 are mounted along the sideboard 300 close to the roof 400 and the string lights 500 are hung onto the hooks 120. To mount a bracket 100, a user places the bracket 100 onto the cup of the mounting tool 210, as shown in FIG. 2. Then using the mounting tool 200, the user pushes the bracket 100 against the sideboard 300 in a manner that the bracket 100 snugly clamps the sideboard 300 as shown in FIG. 3, e.g., the second plate 114 and the third plate 116 flushes with the interior side of the sideboard 302 and the exterior side of the sideboard 304 to help clamp the bracket 100 over the sideboard 300. In some embodiments, the user can use parts of the mounting tool 200, e.g., an arm of the bracket, to further push the bracket 100 over the sideboard 300 for the bracket to fully wrap around the sideboard 300 (see FIG. 3 shows a bracket fully wrapping around the sideboard, and FIG. 4 shows a user further pushing a bracket 100 with an arm of the mounting tool.

In some embodiments, the pole 220 of the mounting tool 200 comprises a single long pole. In some embodiments, the pole 220 is a telescoping pole, wherein each extension piece of the telescoping pole can be locked in place by a locking means 222 known to one of ordinary skill in the art (for example, by inserting a pin 226 into a hole 224 on the pole as shown in FIG. 1). In some embodiments, a pole is about 3 feet to about 10 feet long.

In some embodiments, the opening 204 between the first arm 214 and the second arm 216 is the about the same as width 104 of the first plate of the bracket 104, so that the cup member can tightly hug the bracket as shown in FIG. 2.

In some embodiments, the first plate 112 has a width 104 of about 1.5 inches to about 4 inches, preferably about 2.5 inches, a length 108 of about 5 inches to about 8 inches, preferably about 6 inches. As used herein, the term "about" means plus or minus 10%. In some embodiments, the second plate 114 has a width 102 of about 0.5 inch to about 2 inches, preferably about 1 inch, a length 108 of about 5 inches to about 8 inches, preferably about 6 inches. In some embodiments, the third plate 116 has a width 106 of about 2.5 inch to about 5 inches, preferably about 4 inches, a length 108 of about 5 inches to about 8 inches, preferably about 6 inches. Each of the plates of the bracket has a thickness of about 1/16 inch to about 1/4 inch, preferably about 1/8 inch.

In some embodiments, the bracket 100 may be constructed from a rigid plastic, a metal, an alloy, and the like. In some embodiments, one or more parts of the mounting tool 200 (e.g., an arm of the cup, a pole, etc.) may be constructed from a rigid plastic, a metal, an alloy, and the like.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A kit for hanging string lights, the kit comprising a bracket and a mounting tool;

the bracket comprises a first plate having a first edge and a second edge, a second plate extending upwardly and along the first edge of the first plate, a third plate extending upwardly and along the second edge of the first plate, a hook disposed on a surface of the third plate that extends in a direction away from the second plate; wherein the second plate and the third plate together can tightly clamp a sideboard in between; and a mounting tool comprising a cup member attached to a pole, the cup member being for tightly receiving the bracket; the cup member comprises a base member having a first end and a second end, a first arm attached to and extending outwardly from the first end of the base member, a second arm attached to and extending outwardly from the second end of the base member, the first and second arm extending outwardly in the same direction relative to the base member, a pole attaching to and extending downwardly from the base member;

wherein the cup member can tightly hug the bracket when the first plate of the bracket is placed onto the base member of the cup member and between the first and second arms of the cup member, the first and second arms are effective to stabilize the bracket placed onto the base member.

* * * * *